United States Patent [19]

Cieslik et al.

[11] Patent Number: 5,040,803
[45] Date of Patent: Aug. 20, 1991

[54] CAVITY SEALING ARRANGEMENT AND METHOD

[76] Inventors: David R. Cieslik, 22347 Lavender Bell La., Woodland Hills, Calif. 91367; Patrick L. Miller, 4072 Farley, Kansas City, Mo. 64129

[21] Appl. No.: 512,878

[22] Filed: Apr. 23, 1990

[51] Int. Cl.$^5$ ............... F16J 9/00; B32B 5/18; B23P 19/04; B29C 67/00
[52] U.S. Cl. ........................... 277/12; 277/1; 156/79; 29/460; 52/303; 264/46.6; 264/46.7; 411/508
[58] Field of Search ............ 277/12, 1; 264/46.4, 264/46.6, 46.7; 29/460; 411/508, 509, 510, 913, 82, 258; 52/303, 302; 220/201, 306, 307, 232, 444; 156/78, 79, 91, 92, 94, 293; 137/72

[56] References Cited

U.S. PATENT DOCUMENTS

| | | | |
|---|---|---|---|
| 3,233,502 | 2/1966 | Fernberg | 411/508 |
| 3,400,182 | 9/1968 | Kolt | 264/46.7 |
| 3,956,549 | 5/1976 | Stoebert | 264/46.6 |
| 4,116,893 | 9/1978 | Flanagan | 264/46.6 |
| 4,534,088 | 8/1985 | Ricke | 411/913 |
| 4,618,467 | 10/1986 | Burger et al. | 264/46.6 |
| 4,751,249 | 6/1988 | Wycech | 264/46.6 |
| 4,898,630 | 4/1990 | Kitoh et al. | 156/79 |
| 4,978,266 | 12/1990 | Becker et al. | 411/508 |
| 4,978,562 | 12/1990 | Wycech | 264/46.6 |
| 4,981,310 | 1/1991 | Belisaire | 411/508 |

Primary Examiner—Thomas B. Will
Assistant Examiner—Daniel G. DePumpo
Attorney, Agent, or Firm—D. D. McGraw

[57] ABSTRACT

A vehicle body pillar has a cavity therein through which air flow creating undesirable noise and in which moisture and fluids such as water are not to be collected. An expandable sealant plug is inserted therein and retained in place. The sealant material forming the plug is later expandable under controlled conditions. It is preferably expandable under temperatures of about 275° F. to 400° F. over a period of time. Preferably during the electro-coated paint baking and curing operation, the sealant is exposed to appropriate temperatures for sufficient time to expand the sealant about 800% and cure it, sealing the cavity so as to prevent the flow of air through it. The expanded sealant also effectively blocks the intrusion of fluids such as water, minimizing corrosion within the pillar.

19 Claims, 1 Drawing Sheet

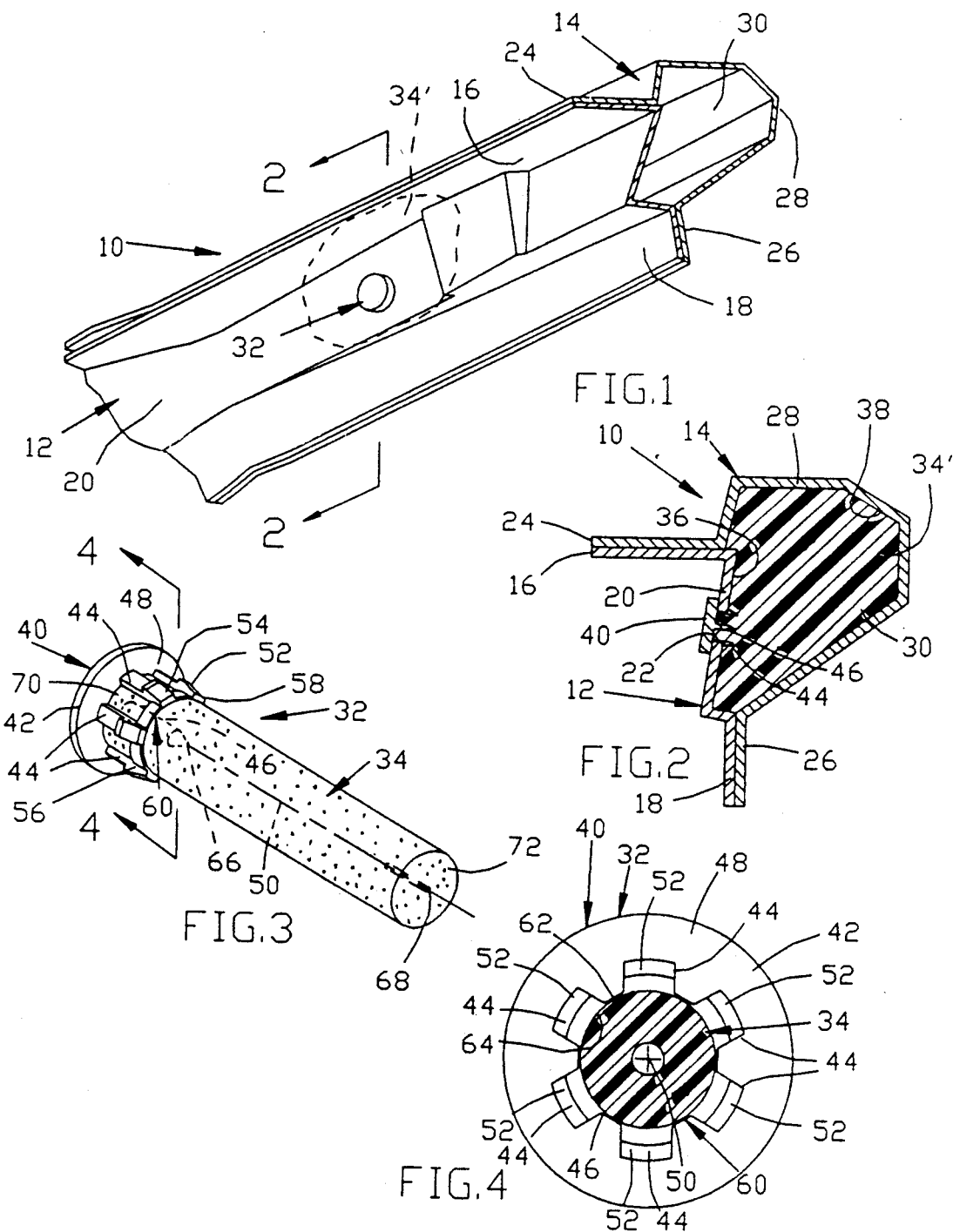

CAVITY SEALING ARRANGEMENT AND METHOD

FIELD OF THE INVENTION

The invention relates to an arrangement and method for sealing cavities, and more particularly for sealing cavities which at times are subject to air flow therethrough which creates objectionable noises, and are also at times are subject to entry of fluids with resultant deleterious effects. The invention is particularly applicable to cavities formed when vehicle body parts such as pillars are manufactured.

Various articles of manufacture are made with cavities located in areas where wind and water, for example, can enter, causing undesirable wind-generated noises and increasing the likelihood that the article will rust because of water remaining in the cavities. In an automobile, the pillars which outline parts of the windshield and other windows and provide support to the roof are such articles of manufacture. As automobile technology has progressed, the interior of the automobile has become quieter and the automobile occupants are more conscious of noises generated by car movement. One class of these noises is wind-generated noise. There are several sources of such noise, and each has been the subject of preventive measures which minimize the noise. One of the sources of such noise has recently been found to be the interiors or cavities created when the body is assembled from various sheet metal parts to form body sections including pillars. These pillars are commonly designated as "A", "B", and "C" pillars. They connect the lower part of the body and the roof, providing the roof support. "A" pillars are those at the front quarters of the passenger compartment on either side of the windshield and immediately forward of the front side doors. "B" pillars are those between the front and rear side doors of a typical four door sedan, station wagon and the like. "B" pillars therefore separate the front side windows from the rear side windows. "C" pillars are at the rear quarters of the passenger compartment on either side of the rear window and aft of all of the passenger compartment side doors in the typical two door passenger car or the typical four door sedan.

In recent years these pillars have been made from inner and outer sheet metal panels which fit together so that mating flanges are welded in place to form particular automobile body sections. Most of the complementary panel areas of each pillar are spaced apart to form a hollow space or cavity between the panels. It is this type of void or cavity that has been found to generate such undesirable noises and also to be subjected to deterioration should moisture be trapped therein. The sources of such moisture include rain, snow, car washes, and road moisture which is splattered on the automobile by passing vehicles, particularly trucks. The road moisture is especially undesirable because it often contains rust accelerators such as sodium chloride used to melt ice during colder months in areas where freezing of water on a roadway is a common winter occurrence.

It is therefore desirable to prevent the flow of air through the hollows or cavities of the pillars, and also to prevent water and similar fluids from entering the cavity and flowing through it, coming to rest at various places and causing rust to start.

The struggle against rust has led to the electro-coating of the vehicle body with anti-rust paints or compounds before the assembly of the vehicle has been completed. These paints or compounds are then commonly cured by baking the entire body or body sections in ovens at temperatures and for appropriate set lengths of time which will result in the paints or compounds drying on and adhering to the inside and outside surfaces of the body or body sections. The electro-coating process commonly includes application of the paints or compounds in all cavities and recesses of the body sections, including the pillar hollows or cavities, using electrically charged paints or compounds and electrically oppositely charged target elements. The vehicle body section is such a target element. The baking process, which usually immediately follows the electro-coating process, involves placing the entire body or body section in an oven and heating the entire body or body section to a predetermined temperature for a predetermined period of time. These temperatures and time periods are such that the particular paints or compounds used are cured in place.

BACKGROUND OF THE INVENTION

In an effort to minimize deleterious air flow in the hollow pillars, and particularly the "A" pillars because they are the ones most susceptible to generation of undesirable wind noises, a hose for conducting sealer in fluid form was inserted into each of the pillar interior access holes. A pumpable, expandable sealer was then pumped into the void portion of the pillar. This was initially done after the pillars had been assembled to the rest of the body. It was also commonly done after the electro-coated paint had been applied and cured. The sealer would have certain ingredients mixed together physically just prior to the point of its being pumped into the pillars, the various ingredients reacting so that the sealer expanded soon thereafter.

The time for the beginning of such reaction had to be controlled as carefully as possible, because the sealer had to retain fluid flow characteristics until the void or cavity of each pillar was sufficiently filled to have a reasonable success rate of blocking it. However, because of this need for retention of the sealer fluid flow characteristics, some of the sealer sometimes flowed on through and out of a pillar before the sealer had properly expanded and lost its fluid flow characteristics, leaving a hole through the length of the pillar through which air could still flow and which would also contribute the entrance and consequent retention of moisture. At times, such a hole would actually increase the audible noise generated by air flow through the pillar, much like a whistle, thus abetting the very condition which it should have alleviated.

The needed retention of the sealer fluid flow characteristics, coupled with the all-too-often flow of the sealer through the length of the pillars, led to orienting each pillar section to be sealed to a position which would place at least a sealable part of the pillar void or cavity at the lowest level while the sealer expanded. This had to be done before the pillar section was assembled to other parts of the vehicle body, and therefore before the electro-coating and baking process was done. The sealer then covered areas of the interior surfaces of the pillar so that they were not later electro-coated with rust inhibitors, leaving such areas vulnerable to rust should the sealer not strongly adhere to those surfaces for the life of the vehicle.

Thus this practice, while better than no effort, was not fully satisfactory, and was time-consuming and more costly than desirable.

Another attempt to solve the air flow and rust problems has involved the use of a heat-expandable sealer introduced into the appropriate cavities which did not require premixing immediately before such introduction, and did not require careful control of the expansion and curing of the sealer from the time of introduction because the sealer was expanded and cured by heat applied to the vehicle body section during paint drying and curing. However, the sealer still had to be introduced with sufficient flow characteristics, whether in the form of a liquid or a powder-like solid which will flow like a liquid, to be placed in the cavities from the point of introduction. Like the above-noted practice, this sealer also sought lower levels which were not the proper locations for the sealer, and also at times flowed on through and out of the cavities, leaving passageways through the cavities through which air and other fluids could still pass. While this solved some of the application problems, it still did not satisfactorily solve all of the problems being encountered.

SUMMARY OF THE INVENTION

By using a preformed, shaped sealant plug consisting of a measured amount of expandable sealant material, inserting it into the pillar access aperture communicating with an intermediate portion of the pillar, and retaining it in place before and while it is expanded, the flow of the previously employed sealer is overcome, as is the need for sectional orientation of the pillar. While it is possible to expand such an expandable sealant material by other means such as introducing a reaction agent which will cause expansion of the plug during the electro-painting cycle, for example, it is preferable to use a heat-expandable sealant material to take full advantage of the ensuing heat application in the oven drying and curing steps of the painting operation. There is no longer a need for performing the sealer injection and expansion operation before assembly of the pillar sections to form integral bodies. Such a preformed and shaped expandable sealant, with the appropriate retainer, can be installed in the pillar at any stage from the time of assembly of the pillar itself to a point immediately prior to the electro-coat baking operation.

By employing a dry, preformed, shaped, heat-expandable sealant that does not begin its expansion until it is subjected to a temperature well above ambient temperatures encountered before the electro-coat baking operation, but is activated to so expand within the elevated range of temperatures employed during the electro-coat baking operation and within the lengths of time such elevated temperatures are present during that operation, the entire interior surfaces of the pillar may be coated with rust inhibitors after the expandable sealant plug is in position in the cavity, after which the rust inhibitors, broadly considered to be paint, are then baked in place. The sealant will expand only after the baking operation is well underway, and will fill the pillar void or cavity within a predetermined longitudinal section of the cavity located on both sides of the access aperture area where the sealant has been inserted and retained. It does not need or have the fluid flow characteristics previously encountered. The expanded sealant will then provide a block against the deleterious flow of fluids including air and water precisely in the desired area in the cavity irrespective of the orientation of the pillar.

The manner of retention of the preformed expandable sealant plug has to be such that it is quickly and easily installed, and will provide a mount for the preformed, expandable sealant plug which will hold that sealant plug in the desired position relative to the interior surfaces of the pillar and the extent of the cavity as the pillar is handled from the moment of insertive retention until the sealant is expanded and cured in the electro-coat baking operation. The expanding sealant has to be prevented from any expansion outward through the access aperture, so that it is retained within the pillar void while expanding.

Such a retainer was therefore devised in the form of a retainer cap. The retainer cap has means cooperatively mating with the expandable sealant plug to hold the plug and the retainer cap together in the desired assembled relationship as a subassembly before the insertion of the sealant plug through the access aperture as well as after such insertion. The retainer cap also has means which will cooperate with the perimeter of the pillar access aperture to latch the cap to the pillar with the expandable sealant plug properly positioned within the pillar cavity. The retainer cap closes the access aperture and is retained in that position during expansion of the sealant, preventing expansion of the sealant plug outward through the access aperture during the sealant expansion step.

Sealant expansion is preferably accomplished by the heat attained during the electro-coat baking operation, but in some instances it may be desirable to apply heat at other times and in other manners, such as the application of localized heat, to attain the requisite temperature range for the requisite time and properly expand the sealant.

BRIEF DESCRIPTION OF THE DRAWINGS

FIG. 1 is a perspective view of a section of a vehicle pillar embodying the invention and having parts broken away and in section.

FIG. 2 is a cross-section view of the vehicle pillar of FIG. 1, taken in the direction of arrows 2—2 of that FIGURE. The sealant is shown after expansion so as to fill the portion of the cavity in the pillar where the section view is taken.

FIG. 3 is a perspective view showing the sealant assembly employed in FIGS. 1 and 2 before the sealant has been expanded.

FIG. 4 is a cross-section view of the sealant assembly of FIG. 3, taken in the direction of arrows 4—4 of that FIGURE.

DETAILED DESCRIPTION

The invention is illustrated as being applied to a body member such as a vehicle body pillar. It is to be understood that it may also be applied to other articles of manufacture having cavities requiring blockage. The portion of the pillar 10 shown in FIG. 1 is the upper portion of the "A" pillar of a typical passenger vehicle body. Pillar 10 is made as a welded sheet metal subassembly formed by the union of a stamped inner panel 12 and a stamped outer panel 14.

Inner panel 12 has generally longitudinally extending flanges 16 and 18 joined by a panel center part 20 of suitable configuration. In the preferred embodiment illustrated, an access aperture 22 is formed in panel center part 20 at an appropriate position where the sealant blockage is to be located in the cavity of the pillar. Aperture 22 is better seen in FIG. 2, since it is located under the retainer cap to be described. Outer panel 14 has generally longitudinally extending flanges 24 and 26 joined by a panel center part 28 of suitable configuration. Flanges 16 and 24 and flanges 18 and 26 are respective mating flanges which are placed in full surface engagement as shown in FIGS. 1 and 2. The flanges are then welded together by suitable means such as spot welding to join the stamped inner and outer panels 12 and 14 together and form the pillar subassembly 10. The panel center parts 20 and 28 have configurations which provide the desired stiffness and load-carrying characteristics to the pillar 10 and at the same time define the void or cavity 30 extending longitudinally within the pillar 10. Cavity 30 is a longitudinally extending enclosed space, and access aperture 22 opens into it through the center part 20 of inner panel 12.

The sealant assembly 32, which is also a subassembly part, is illustrated in FIGS. 1 and 2 after the sealant plug 34 has been expanded so as to block the cavity 30. The expanded sealant is identified in those FIGURES by the reference character 34'. The sealant in the form of sealant plug 34 is illustrated in FIGS. 3 and 4 before it has been expanded.

The expandable sealant plug 34 of FIGS. 3 and 4 is preferably cylindrical in shape, and is about the same length as the space along the axis of aperture 22 from the inner surface 36 of inner panel 12 to the inner surface 38 of the outer panel 14. The volume of the sealant plug 34 is carefully controlled so as to control the volume of the expanded sealant 34'. If, for example, the sealant will expand eight-fold when heated, the sealant plug 34 is one-eighth of the desired volume of the expanded sealant 34'.

In addition to the sealant plug 34, the sealant assembly 32 includes a retainer cap 40. This cap is preferably made of a relatively hard plastic material. A typical example is that of a hard nylon. While the retainer cap may be made of metal, this introduces an unnecessary risk of rust that is obviated when such plastic material is used. Cap 40 must withstand the heat of the electro-coat baking process without loss of its retention functions.

Cap 40 has a base 42 which is illustrated as being circular and of somewhat larger diameter than the diameter of the access aperture 22. A circumferentially spaced series of retaining legs 44 and an axially located pin 46 extend from one side 48 of the base 42. The legs and the pin are preferably perpendicular to the plane of the base. Pin 46 is located along an axis 50 passing through the center of the base 42. This axis also is the axis about which retaining legs 44 are circumferentially spaced. Those legs are preferably parallel to the axis 50, but they may be somewhat angularly offset if desired. The ends of the retaining legs 44 opposite the base 42 are formed with external snap hooks 52. The outer surfaces 54 of hooks 52 are tapered from the hook notches 56 toward the outer ends 58 of the legs to provide cam-like guide surfaces which facilitate the insertion of the retainer cap into the access aperture 22.

In the preferred embodiment illustrated in the drawing, the outer ends 58 of the retaining legs 44 are connected by segments of a somewhat flexible guide and support ring 60 which is molded as an integral part of the retainer cap. Ring 60 is therefore made up of the ring segments and the portions of the legs 44 connected by the ring segments. The diameter of the circle on which the segmental inner surfaces 62 of ring 60 are formed is preferably the same as the diameter of the circle on which the inner surfaces 64 of the retainer legs 44 are formed. Therefore the inner surfaces 62 and 64 combine to effectively form a complete circumferentially extending ring inner surface, the inner surfaces 62 of the ring segments being continuations of the cylindrical segments of legs 44 defining the inner surfaces 64. The diameter of the ring inner surfaces 62 and 64 is preferably the same as or very slightly larger than the outer diameter of the pre-expanded sealant plug 34. The portions of ring 60 formed by the ring segments joining the retaining legs 44 are preferably thin and flexible enough to permit some cantilever-like flexibility of the retainer legs, but at the same time provide some resistance to such flexibility in radial directions. This last characteristic adds to the retentive capability of the retainer cap after it has been installed in the access aperture 22. It is to be understood, however, that for some installations the ring 60 may be omitted and the retaining legs are not joined at their ends remote from the cap base 42.

Pin 46 has its free end pointed and extending about as far from the base 42 as do the retainer legs 44. It may be somewhat longer or shorter than those legs if desired. The pre-formed expandable sealant may have a small axially extending recess 68 located on its axis 50 and opening through the sealant end 70. For simplicity of assembly, both ends 70 and 72 of the sealant may be so formed with recesses 68 so that either end of the sealant plug can be inserted into the retainer cap. While this recess 68 is not necessary, it may contribute to the ease of assembly of the sealant plug to the retainer cap. This is especially the case when the pin 46 is somewhat longer than the retaining legs 44 and therefore engages and begins to penetrate the sealant plug 34 before any part of the sealant plug otherwise engages the cap 40.

When the expandable sealant plug 34 is being secured to and mounted on the retainer cap 40, its axial center is placed over the pin pointed end 66 and the cap is pushed onto the sealant until the side surface 48 of the cap base 42 engages the end 70 of the sealant plug. As the sealant plug is pushed onto the pin, it is also being moved axially within the ring 60 and the retaining legs 44. The pin 46, being of larger diameter than the recess 68 of the sealant end 70, causes the end of the sealant plug 34 receiving the pin to expand radially. If there is no such recess 68, the pin makes its own recess as the insertion process proceeds. In either instance, it radially expands the portion of the expandable sealant plug 34 into which the pin extends. This expansion assures a tighter gripping relation between the sealant plug on the one hand and the retainer legs and the retainer ring on the other hand.

The expandable sealant plug 34 has some spring-like resiliency, somewhat like a dry foam rubber, which provides resistance to laterally inward movements of the retaining leg snap hooks which is overcome by the camming action of the aperture perimeter or rim on the camming surfaces 54 of the retaining legs during insertion of the subassembly 32 into the body member cavity 30. This spring-like resiliency resistance aids in preventing the snap hooks from becoming unhooked from the aperture perimeter or rim once the snap hooks have hooked under it.

After the shaped expandable sealant plug 34 is formed and the plug has been inserted into the retaining legs 44 of the retainer cap 40, the subassembly 32 so formed by the plug and the cap may be temporarily stored or transported to the location where the remainder of the process is to be carried out.

Typically, each body member 10 will require only one access aperture 22, although it is within the purview of the invention that two or more such apertures may be provided, and a plug and cap subassembly 32 may be inserted in each of such apertures. Such an arrangement would then provide spaced sealant locations within cavity 30 with the plurality of expanded sealants 34′ either being in longitudinally spaced or longitudinally joining relation. For simplified description, it is further considered that only one such plug and cap subassembly 32 is to be inserted in a body member.

A plug and cap subassembly 32 such as the one illustrated in FIG. 3 is inserted into the access aperture 22 so that the retaining legs 44 extend through the aperture and latch onto the inner panel 12 with the hook notches 56 engaging the inner surface 36 of that panel. The sealant plug 34 is therefore located in the cavity 30. It will extend generally transversely of that cavity toward inner wall surface 38.

The electro-coating step of the body member 10 may be done before the subassembly 32 is installed. This permits the entire inner surfaces 36 and 3 of the panels 12 and 14 to be protected by the paint while having no coat of uncured paint on the sealant plug 34. However, it is also satisfactory to perform the electro-coating step after the subassembly 32 has been installed. Any paint that adheres to the sealant plug 34 will have no adverse effect on the performance of the seal, because it will still expand as desired when the requisite heat is applied.

When the electro-coat baking step of the operation is then performed, the electro-coated paint, the body member, and the sealant plug 34 are heated to a predetermined temperature and are held at that temperature for a predetermined time. In addition to baking and curing the paint, the heat applied to the sealant plug 34 acts to expand and then cure the sealant within the body member cavity. This generates the expanded sealant plug 34′ which blocks and seals the body member cavity against deleterious wind noise and water intrusion. The retainer cap 40 is retained in its mounted position within the access aperture 22 and keeps that aperture closed so that the expanding sealant does not expand outwardly through the aperture.

The heat-expandable sealant material forming the plug 34 must expand and cure during the paint oven heats to provide the desired seal block in cavity 30. Such sealant preferably has no toxic noxious odor so as to have no adverse effects on personnel. It should expand between about 750% and 850% and then be cured when baked within the time range of about 30 minutes to 60 minutes at temperatures ranging from about 275° F. to 400° F. These ranges may be modified to 700% to 900% expansion, with possibly a slightly shorter time limit such as 20 minutes being provided. The important limits are those set by the paint baking times and temperatures, which may change as different paints are used. However, these identified ranges are commensurate with current electro-coated paint baking and curing practice.

The sealant 34′ should permit no evidence of corrosion between the expanded sealant 34′ and the cavity walls 36 and 38, even after one week of applied salt spray, three weeks at 100° F. and 100% humidity, a cyclic thermal stress, or high temperature exposure up to 400° F. for one hour. There should be no brittleness or cracking of the expanded sealant when it is aged for two weeks at 70° C. It should be sufficiently stable that no deleterious effect occurs after being held at a temperature of 54° C. for seventy-two hours. It should withstand at least two impacts of fifteen inch-pounds at −29° C. without cracking or loss of adhesion. It should have less than 5% water absorption, and preferably under 2%. It must be compatible with the electrocoated paint process when it is to be expanded during the baking and curing step of that process. It must not be flammable with a minimum of 50 passes of an open flame across it.

Such a sealant is produced by the Orbseal Corporation of Moberly, Mo. and identified by Orbseal specification 136.2. It is a highly expandable dry sealant material which may be molded as a plug such as sealant plug 34.

We claim:

1. A sealant assembly for use in a body member having a longitudinally extending cavity to be blocked against noise-generative air flow therethrough and the passage of liquids, the body member having an access aperture opening into the cavity in the vicinity of the portion of the cavity to be blocked; said sealant assembly comprising:

a retainer cap and an expandable sealant plug mounted to said cap;

said plug being pre-shaped to extend into the body member cavity through the access aperture, said retainer cap including first means cooperatively mating with said sealant plug to hold said plug and said retainer cap together in a desired assembled relationship, said retainer cap further including second means cooperable with the body member access aperture perimeter to latch said retainer cap to the body member with said sealant plug positioned within the body member cavity, said sealant plug being retained in such position by said retainer cap;

said plug being adapted to thereafter be expanded while said plug is so positioned within the body member cavity, and when so expanded filling the cavity within a predetermined longitudinal section of said cavity located on both sides of the access aperture and providing a block against the deleterious flow of fluids including air and water;

said retainer cap being adapted to close the body member access aperture and prevent expansion of said sealant plug outward through the access aperture while said sealant plug is being expanded.

2. The sealant assembly of claim 1 in which said expandable sealant plug is a cylinder having a diameter slightly less than the diameter of the body member access aperture and the volume of said expandable sealant plug is at least equal to the volume of the longitudinal section of the body member cavity to be filled by the expanded sealant plug divided by the coefficient of expansion of said sealant plug.

3. The sealant assembly of claim 1 in which said retainer cap has a base of greater diameter than the diameter of the body member access aperture and preshaped to have one side thereof conformed to the outer surface of the body member immediately around the body member access aperture so as to mate therewith in aperture-closing relation when said retainer cap is latched to the body member through the body member access aperture.

4. The sealant assembly of claim 1 in which said retainer cap has a base of greater diameter than the diameter of the body access aperture, and a circumferentially spaced series of cantilever spring-like retaining legs located on a circle and extending from one side of said cap base and substantially perpendicular thereto, each of said retaining legs having laterally inward and outward facing side walls and laterally outward facing snap hooks formed on said outward facing side walls in longitudinally spaced relation from said retainer base, said retaining legs having outer end cam surfaces formed on said outward facing side walls adjacent to said snap hooks, said cam surfaces being adapted to engage the perimeter of the body member access aperture when said retainer cap is inserted into that aperture, said snap hooks being adapted to extend through the body member access aperture and with laterally outward springing action secure said retainer cap to the body member by hooking under the perimeter of that aperture and preventing removal of said retainer cap under pressure of expansion of said sealant plug.

5. A sealant assembly for use in a body member having a longitudinally extending cavity to be blocked against noise-generative air flow therethrough and the passage of liquids, the body member having an access aperture opening into the cavity in the vicinity of the portion of the cavity to be blocked; said sealant assembly comprising:
a retainer cap and a heat-expandable sealant plug mounted to said cap;
said plug having a definitive form pre-shaped to extend into the body member cavity through the access aperture, said retainer cap including first means cooperatively mating with said expandable sealant plug to hold said plug and said retainer cap together in a desired assembled relationship,
said retainer cap further including second means cooperable with the body member access aperture perimeter to latch said retainer cap to the body member with said sealant plug positioned within the body member cavity,
said sealant plug being retained in such position by said retainer cap;
said plug being adapted to thereafter expand under heat applied to the body member while said plug is so positioned within the body member cavity, and when so expanded filling the cavity within a predetermined longitudinal section of said cavity located on both sides of the access aperture and providing a block against the deleterious flow of fluids including air and water;
said retainer cap being adapted to close the body member access aperture and prevent expansion of said sealant plug outward through the access aperture while said sealant plug is expanded by heat as set forth above.

6. The sealant assembly of claim 5 in which the definitive form of said heat-expandable sealant plug is a cylinder having a diameter slightly less than the diameter of the body member access aperture and the volume of said sealant plug is at least equal to the volume of the longitudinal section of the body member cavity to be filled by the expanded sealant plug divided by the coefficient of expansion of said sealant plug when heated.

7. The sealant assembly of claim 6 in which the volume of said heat-expandable sealant plug is greater than the volume of the longitudinal section of the body member cavity to be filled by the expanded sealant plug divided by the coefficient of expansion of said sealant plug when heated, insuring that the longitudinal section of the body member cavity to be filled is so filled even though said sealant plug when so expanded under heat has longitudinally outer parts thereof within said cavity but not completely filling the entire cross section of the longitudinal section of the body member cavity in portions of the longitudinal section of the body member cavity longitudinally adjacent the longitudinal section of the body member cavity to be completely filled.

8. The sealant assembly of claim 5 in which said retainer cap has a base of greater diameter than the diameter of the body member access aperture and preshaped to have one side thereof conformed to the outer surface of the body member immediately around the body member access aperture so as to mate therewith in aperture-closing relation when said retainer cap is latched to the body member through the body member access aperture.

9. The sealant assembly of claim 5 in which said retainer cap has a base of greater diameter than the diameter of the body access aperture, and a circumferentially spaced series of cantilever spring-like retaining legs located on a circle and extending from one side of said cap base and substantially perpendicular thereto, each of said retaining legs having laterally inward and outward facing side walls and laterally outward facing snap hooks formed on said outward facing side walls in longitudinally spaced relation from said retainer base, said retaining legs having outer end cam surfaces formed on said outward facing side walls adjacent to said snap hooks, said cam surfaces being adapted to engage the perimeter of the body member access aperture when said retainer cap is inserted into that aperture, said snap hooks being adapted to extend through the body member access aperture and with laterally outward springing action secure said retainer cap to the body member by hooking under the perimeter of that aperture and preventing removal of said retainer cap under pressure of expansion of said sealant plug.

10. The sealant assembly of claim 9 in which said retainer cap retaining legs have a support ring integrally formed therewith at the ends thereof opposite said retainer cap base, the inner diameter of said ring snugly receiving said sealant plug and being an axially extending continuation of the inner side walls of said retaining legs, said support ring supporting said sealant plug and also supporting said retaining legs against sufficient cantilever movements to release said snap hooks while said sealant plug is being expanded under heat and exerting expansion pressure on said retainer cap.

11. The sealant assembly of claim 10 in which said heat-expandable sealant plug is also snugly received by the inner side walls of said retaining legs.

12. The sealant assembly of claim 10 in which said heat-expandable sealant plug has some spring-like resiliency which provides resistance to laterally inward movements of said retaining leg snap hooks which is overcome by camming action on said legs during insertion of said sealant plug and said retainer cap retaining legs into the body member cavity, said sealant plug spring-like resiliency resistance aiding in preventing said snap hooks from becoming unhooked from the perimeter of the body member access aperture once said snap hooks have hooked thereunder.

13. The sealant assembly of claim 10 in which said retainer cap has a pin located coaxially with the circle of location of said retaining legs and extending from said retainer cap base, said sealant plug being impaled on said pin for further retention of said plug to said retainer cap.

14. For use in a sealant assembly comprising an expandable sealant plug and a retainer cap, a retainer cap comprising: a base of greater diameter than the diameter of a body member aperture into which the retainer cap is adapted to be inserted and secured so as to cover that aperture when the retainer cap is so inserted and secured, a circumferentially spaced series of cantilever spring-like retaining legs located on a circle and extending from one side of said retainer cap base and being substantially perpendicular to said retainer cap base, and a pin located coaxially with the circle of location of said retaining legs and extending from said one side of said retainer cap base, said pin being adapted to have the sealant plug impaled thereon for further retention of the plug to said retainer cap, each of said retaining legs having laterally inward and outward facing side walls and laterally outward facing snap hooks formed on said outward facing side walls in longitudinally spaced relation from said retainer cap base, said retaining legs having outer end cam surfaces formed on said outward facing side walls adjacent to said snap hooks, said cam surfaces being adapted to engage the body member material defining the perimeter of the body member aperture when said retainer cap is inserted into that aperture, said snap hooks being adapted to extend through the body member aperture and with laterally outward springing action secure said retainer cap to the body member by hooking under the body member material defining the perimeter of that aperture and preventing removal of said retainer cap under pressure of expansion of the sealant plug.

15. The retainer cap of claim 14 in which said retainer cap retaining legs have a resiliently flexible support ring integrally formed therewith at the ends thereof opposite said retainer cap base, the inner diameter of said ring being adapted to snugly receive the expandable sealant plug and being an axially extending continuation of the inner side walls of said retaining legs, said support ring being adapted to support said expandable sealant plug and also being adapted to resiliently support said retaining legs against sufficient cantilever movements to release said snap hooks while the sealant plug is being expanded under heat and exerting expansion pressure on said retainer cap.

16. A method of sealing a body member cavity against deleterious wind noise and water intrusion, said method comprising the steps of:
  (a) forming a shaped, heat-expandable sealant plug to a definitive form;
  (b) inserting the so-formed plug into retaining legs of a retainer cap and securing the plug to the retainer cap;
  (c) inserting the plug and the retainer cap retaining legs into and through a body member aperture opening into the body member cavity;
  (d) heating at least the sealant plug to a predetermined temperature and holding at least the body plug substantially at that temperature for a predetermined time, the heat applied to the sealant plug for the predetermined time acting thereon to expand the sealant plug within the body member cavity and generate an expanded sealant plug which blocks and seals the body member cavity against deleterious wind noise and water intrusion;
  (e) and retaining the retainer cap mounted within the body cavity aperture, keeping the aperture closed with respect to the expanding sealant plug.

17. A method of sealing a body member cavity against deleterious wind noise and water intrusion, said method comprising the steps of:
  (a) forming a shaped, heat-expandable sealant plug;
  (b) inserting the plug into retaining legs of a retainer cap and securing the plug to the retainer cap;
  (c) inserting the plug and the retainer cap retaining legs into and through a body member aperture opening into the body member cavity;
  (d) heating at least the sealant plug to a predetermined temperature within the range of 275 degrees Fahrenheit to 400 degrees Fahrenheit;
  (e) holding at least the sealant plug temperature substantially at the predetermined temperature for a predetermined time within the range of 20 to 60 minutes;
  (f) expanding the sealant plug by 700% to 900% by volume in response to the heat applied to the sealant plug for the predetermined time acting thereon within the body member cavity and generating an expanded sealant plug which blocks and seals the body member cavity against deleterious wind noise and water intrusion;
  (e) and retaining the retainer cap mounted within the body cavity aperture, keeping the aperture closed with respect to the expanding sealant plug.

18. A method of sealing a body member cavity such as a pillar of an automobile body against deleterious air flow noise and water intrusion comprising the steps of:
  (a) inserting a heat-expandable sealant plug into the body member cavity at a desired location within the cavity;
  (b) retaining the heat-expandable sealant plug within the body member cavity at the desired location;
  (c) electrocoating the body member with a protective coating to be baked thereon;
  (d) baking the body member and the sealant plug within a predetermined temperature range and for a predetermined period of time until the protective coating is cured;
  (e) and utilizing the heat applied during the baking step
  (d) to expand the sealant plug to fill a cross section part of the body member cavity and seal that cavity against deleterious air flow noise and water intrusion.

19. The method of claim 18 more particularly comprising:
  in step (d) heating the body member and the sealant plug to a predetermined temperature within the range of 275 degrees Fahrenheit to 400 degrees Fahrenheit and holding the body member and the sealant plug temperature substantially at the predetermined temperature for a predetermined time within the range of 20 to 60 minutes;
  in step (f) expanding the sealant plug by 700% to 900% by volume in response to the heat applied to the sealant plug for the predetermined time acting thereon within the body member cavity;
  and also during step (f) keeping the aperture closed with respect to the expanding sealant plug by continued retention of the retainer cap mounted within the body cavity aperture, the expansion of the sealant plug exerting pressure-like force on the retainer legs further tending to keep the retainer legs in continued retention.

* * * * *